US008224723B2

(12) United States Patent
Bosch et al.

(10) Patent No.: US 8,224,723 B2
(45) Date of Patent: Jul. 17, 2012

(54) ACCOUNT OPENING SYSTEM, METHOD AND COMPUTER PROGRAM PRODUCT

(75) Inventors: Joel Joseph Bosch, San Francisco, CA (US); Prashant Rathi, Fremont, CA (US); Kathleen Marie Howcroft, Manchester, NH (US); Robert McCoy West, Dublin, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1494 days.

(21) Appl. No.: 10/161,347

(22) Filed: May 31, 2002

(65) Prior Publication Data
US 2003/0225692 A1    Dec. 4, 2003

(51) Int. Cl.
*G06Q 40/00* (2012.01)
(52) U.S. Cl. ............................................. 705/35; 705/38
(58) Field of Classification Search .................. 705/35, 705/38
See application file for complete search history.

(56) References Cited

U.S. PATENT DOCUMENTS

| 4,780,828 | A | * | 10/1988 | Whisker ....................... 705/404 |
|---|---|---|---|---|
| 5,677,955 | A | | 10/1997 | Doggett et al. |
| 5,699,527 | A | | 12/1997 | Davidson |
| 5,742,775 | A | | 4/1998 | King |
| 5,832,461 | A | | 11/1998 | Leon et al. |
| 5,870,721 | A | | 2/1999 | Norris |
| 5,870,724 | A | | 2/1999 | Lawlor et al. |
| 5,905,976 | A | | 5/1999 | Mjolsnes et al. |
| 5,940,811 | A | | 8/1999 | Norris |
| 5,940,812 | A | | 8/1999 | Tengel et al. |
| 5,963,647 | A | | 10/1999 | Downing et al. |
| 5,978,780 | A | | 11/1999 | Watson |
| 6,014,465 | A | | 1/2000 | Blixt et al. |
| 6,014,645 | A | | 1/2000 | Cunningham |
| 6,049,782 | A | * | 4/2000 | Gottesman et al. ......... 705/36 R |
| 6,088,686 | A | | 7/2000 | Walker et al. |
| 6,105,007 | A | * | 8/2000 | Norris ............................. 705/38 |
| 6,131,810 | A | | 10/2000 | Weiss et al. |

(Continued)

FOREIGN PATENT DOCUMENTS

EP    1102224 A2    5/2001

(Continued)

OTHER PUBLICATIONS

ShareBuilder(R) Offers the Gift a Child Can Grow Up With—Stocks. (Dec. 3). PR Newswire,1. Retrieved Apr. 30, 2008, from Business Dateline database. (Document ID: 93245835).*

(Continued)

*Primary Examiner* — Shahid Merchant
(74) *Attorney, Agent, or Firm* — Hunton & Williams LLP

(57) ABSTRACT

A system that facilitates opening of a bank account by banking personnel for a customer. The account opening system includes an automatic rate determination feature that uses customer information, account information and other criteria to determine an account interest rate. The rate determination system may also mediate rate negotiation between a personal banker and the customer by limiting the increase in rate awarded by the personal banker. An auditing system assigns numbers to a series of profiles, each describing a request to open an account. Profiles to be audited are determined by generating random numbers that fall within the range of assigned profile numbers. Random number generation is repeated until a threshold percentage of profiles have been selected for auditing. The account opening system includes a system for tracking the progress of the account application and for organizing information recorded by the personal banker during interactions with the customer.

22 Claims, 15 Drawing Sheets

U.S. PATENT DOCUMENTS

| | | |
|---|---|---|
| 6,202,054 B1 | 3/2001 | Lawlor et al. |
| 6,324,524 B1 | 11/2001 | Lent et al. |
| 6,405,181 B2 | 6/2002 | Lent et al. |
| 6,513,019 B2 | 1/2003 | Lewis |
| 6,567,791 B2 | 5/2003 | Lent et al. |
| 6,609,113 B1 | 8/2003 | O'Leary et al. |
| 6,718,313 B1 | 4/2004 | Lent et al. |
| 6,877,656 B1 | 4/2005 | Jaros et al. |
| 6,968,317 B1 | 11/2005 | Wallace et al. |
| 7,131,583 B2 | 11/2006 | Jaros et al. |
| 7,143,063 B2 | 11/2006 | Lent et al. |
| 7,222,094 B2 | 5/2007 | Ross |
| 7,376,606 B2 | 5/2008 | Jacobsen |
| 2002/0065752 A1 | 5/2002 | Lewis |
| 2002/0194094 A1* | 12/2002 | Lancaster et al. ............... 705/35 |
| 2003/0033212 A1 | 2/2003 | Sandhu et al. |
| 2003/0041025 A1* | 2/2003 | Bonalle et al. ................. 705/39 |
| 2003/0078883 A1 | 4/2003 | Stewart et al. |
| 2003/0093351 A1 | 5/2003 | Sarabanchong |
| 2003/0120566 A1* | 6/2003 | Lipschutz et al. ............. 705/30 |
| 2003/0135457 A1 | 7/2003 | Stewart et al. |
| 2003/0140004 A1 | 7/2003 | O'Leary et al. |
| 2003/0163400 A1 | 8/2003 | Ross et al. |
| 2003/0191714 A1 | 10/2003 | Norris |
| 2003/0233317 A1 | 12/2003 | Judd |
| 2003/0236728 A1 | 12/2003 | Sunderji et al. |
| 2004/0117300 A1* | 6/2004 | Jones et al. ..................... 705/39 |
| 2005/0038737 A1 | 2/2005 | Norris |
| 2005/0144061 A1 | 6/2005 | Rarity et al. |
| 2007/0136169 A1 | 6/2007 | Dilip et al. |

FOREIGN PATENT DOCUMENTS

| | | |
|---|---|---|
| WO | WO 01/39589 A2 | 6/2001 |
| WO | WO 01/41355 A1 | 6/2001 |

OTHER PUBLICATIONS

BankServ, http://www.bankserv.com/products/bankserv_open.htm, 2001, 4 pages, [internet accessed Feb. 4, 2005].

* cited by examiner

ACCOUNT OPENING SYSTEM, METHOD AND COMPUTER PROGRAM PRODUCT

BACKGROUND OF THE INVENTION

1) Field of the Invention

The present invention is related to the field of electronic banking systems, and in particular, electronic systems for facilitating the opening of accounts for customers.

2) Description of Related Art

A bank often offers a range of account types, such as money market accounts, savings accounts, and certificates of deposit, that provide a return, in the form of interest, on the principal deposited by a customer. The bank then typically loans or invests the deposited funds in an attempt to garner a percentage rate of return that is in excess of the interest awarded to the customer. Income is earned from the difference between the interest rates, so the bank is under pressure to make the difference as large as possible. On the other hand, the bank may fail to attract borrowers if it does not charge interest rates low enough on loans to compete with other lenders. Further, a bank must award high enough interest rates on its accounts to attract deposits. Even if revenue is earned on the differential, administrative costs will reduce the net profit from the revenue. Lowering administrative costs, therefore, creates a large benefit for the bank by increasing its net profit margins and allowing it to award higher interest rates to depositors and charge lower interest rates for loans.

The original method for opening an interest bearing account was for the customer to send a letter containing personal information and a check for the deposit amount. However, the process of deciphering the customer's handwriting is difficult and prone to error. As an alternative, the bank can send a fulfillment package to the customer containing an application for the account. The application provides a more readable format for the customer's request to open the account. Despite the improvement in readability, data from the application must still be entered into a database and errors during transcription of the application are not uncommon.

Each time an account is opened, the personal banker opening the account on the customer's behalf must determine an interest rate. To facilitate rate determination, the bank periodically publishes several rate sheets that include lists of approved rates. The personal banker uses various factors, such as the type of account, the term of the deposit and the amount of the deposit to locate the appropriate rate on the rate sheets. The number of rate sheets and the amount of variables that must be considered can result in errors in rate determination The personal banker may be given leeway to modify the interest rates indicated on the rate sheets. When determining whether to modify the interest rate, the personal banker can take into account several factors, such as the total balance in the customer's existing accounts or the length of the customer's relationship with the bank. Despite the leeway to negotiate rates up front, each rate exception must be carefully considered before approval because improperly awarded rate exceptions can have a large effect on profitability. Each rate exception must be approved by a supervisor and personal banker. Rate exceptions that are outside of predetermined guidelines are sent to a treasury department for further review and approval. In addition, all rate exception materials are sent to a new account center for auditing and electronic recording. As can be seen from its description, the rate exception process requires multiple approvals and is therefore a costly administrative process.

In addition to the transcription and rate determination processes described above, the opening of new accounts generally involves many other manual processes each performed by different banking personnel. For instance, the opening of an account can also include auditing to ensure accuracy, inspections for fraud, reconciliation of funds and distribution of informational materials about the account, such as a welcome kit, to the customer. The bank may also run promotions that either credit the customer with additional funds or additional basis points. The promotions may run for a specific period of time and would apply based on specific personal or account information. Each of these processes must be implemented and documented with accuracy to ensure that each account is opened expeditiously and with a minimum of errors.

It would be advantageous to have a system for opening accounts that minimizes administrative costs without an undue amount of errors. It would be further advantageous to have a process for recording account opening requests that is easy, fast and reliable. It would also be advantageous to have a rate determination process that allows for an accurate, but flexible, determination of rates. In addition, it would be advantageous to have an integrated auditing and fraud inspection process that allows the bank to verify the correct entry and validity of various customer and account information.

BRIEF SUMMARY OF THE INVENTION

The present invention addresses the above needs and achieves other advantages by providing a system for opening and funding an account for a customer. The system includes an automatic rate determination feature that uses customer information, account information and other criteria to determine an interest rate for the account. The rate determination system may also mediate rate negotiation between a personal banker and the customer by limiting the increase in rate awarded by the personal banker. In another option, the system may alter the limits depending upon the title of the person performing the negotiation. The account opening system may also include an auditing system that assigns numbers to a series of profiles each describing a request to open an account. The profiles to be audited may be determined by generating random numbers that fall within the range of assigned profile numbers. Random number generation may be repeated until a threshold percentage of profiles have been selected for auditing. The account opening system may also include a system for tracking the progress of the account application and for organizing information recorded by the personal banker during interactions with the customer.

In one embodiment the present invention includes a system for opening an interest bearing account for a customer. The account opening system includes a customer information system configured to prompt and record entry of customer information. In particular, the account information system is configured to prompt and record a rate lock code, a term, a deposit amount and an account type selection. A rate decision system uses the received date, rate lock code, term and deposit amount, along with the account type selection, as criteria to determine the interest rate for the interest bearing account. The account opening system further includes an account activation system capable of receiving the deposit amount submitted by the customer, activating the interest bearing account and crediting the deposit amount at the interest rate.

The customer information system may be further configured to pre-fill a customer application based on information provided by the customer. The customer application is included in a fulfillment kit which is sent to the customer for completion and return. Optionally, the fulfillment kit may also include product or promotional information. The customer information system may also be configured to directly prompt and record input from the customer over the Internet or an intranet, such as by using a plurality of web pages. Alternatively, the customer information system may include a data entry specialist entering customer information submitted by the customer over the public telephone network.

The customer information system may be further configured to review the customer information in real time as it is input and validate the customer information using a predetermined set of rules. These rules include edits for certain data-entry fields, such as a social security number field, to ensure proper formatting of the customer information as it is entered. Additionally, the system verifies that the customer (or data entry specialist) entered information in selected fields required to open the account.

The rate decision system may also be configured to record an application date on which the application was made and a receipt date upon which the funds were received. The application and receipt dates are also used as criteria for determining the interest rate of the account. The rate decision system uses the application and receipt dates, and the other criteria, to consult a table to determine the interest rate. Periodically, the table is updated by the bank to reflect ongoing rate changes.

The rate decision system can optionally include a negotiation aspect wherein the interest rate can be adjusted pursuant to negotiations with the customer. Preferably, the rate negotiation system is capable of limiting the adjustment based on various criteria, such as the title of the person negotiating on the bank's behalf. All of the rate negotiations are captured and stored for later approval or reference. The rate decision system may also include the ability to adjust the rate based on a promotional code. Promotional codes are used as an incentive for the customer to open selected types of accounts and can be communicated to the customer through advertisements, such as by inclusion in the promotional information sent with the fulfillment kit or sent over the internet.

Various accounts can be selected by the customer including individual, joint, trust and custodial accounts. Other account type options include offline or online accounts, depending upon whether the accounts are opened over a network such as the Internet. For certificates of deposit, the customer can select between a mini, jumbo, and super jumbo certificate of deposit which also has an effect on the interest rate determined by the rate decision system.

In another embodiment, the present invention includes a system for opening an account for a customer including a customer information system, an account information system, an audit system and an account activation system. The customer information system is configured to prompt entry of information about the customer and to record the information as one of a plurality of profile listings. The account information system is capable of prompting and recording an account type selection and associating the account type selection with the profile listing as part of an account application. The account information system is capable of assigning each of the account applications a confirmation number. The audit system is configured to generate a random number and to use the random number to identify the corresponding confirmation number of the profile listing which is to be audited for quality control. The account activation system is capable of receiving the deposit amount submitted by the customer, activating the account and crediting the deposit amount to the account. Optionally, the audit system may also be configured to use the random number to identify, and initiate auditing, of a corresponding account number of an account that has already been opened and funded.

The profile number may be an integer between 1 and 100 and the random number may correspondingly be a randomly generated integer between 1 and 100. Several random numbers may be generated with the quantity of random numbers being generated corresponding to the percentage of the profiles for which audit is desired. The audit system can re-record the customer information associated with the profile listings and can compare the re-recorded customer information with the profile listings to determine if any errors were made during data entry.

The account opening system can also include an audit system that requires re-keying and comparison of the limited information necessary for the rate determination system to determine a rate, including a rate lock code, a term, a receipt date and a deposit amount. Re-keying of the information required for rate determination is preferably performed on all of the account applications.

The account opening system may further include a fraud detection system configured to verify the identity of a customer. Identity verification includes comparing the customer information with information obtained by an outside agency, such as a credit bureau. The fraud detection system retrieves the customer information from the customer information system, formats it, and sends it to the outside agency. The outside agency returns scoring information to the fraud detection system. Generally, the scoring information is indexed to a calculated risk that fraud is occurring. Automatic formatting of the customer information by the fraud detection system eliminates manual re-keying of the customer information into a separate fraud detection system.

In yet another embodiment, the account activation system is capable of receiving the deposit amount, crediting the deposit amount to the interest bearing account on the receipt date and activating the interest bearing account regardless of whether a reconciliation cutoff time has tolled. The account activation system is further capable of reconciling the credited deposit amount by clearing the deposit amount after the receipt date, such as the following day. A package distribution system configured to prepare account information packages upon receipt and crediting of the deposit amount can prepare the package on the receipt date when used with the account activation system. Preparing on the receipt date allows the information package to be sent early in the morning of the next day without waiting for reconciliation.

In another aspect, the customer information system is configured to prompt and record a funding option. The funding options may include an electronic funds transfer (EFT), such as an electronic debit through an automated clearing house (ACH), or an internal transfer from another account at the same bank. In cases where electronic funding is selected by the customer, the account activation system can automatically proceed with opening and funding of the account subsequent to receiving approval by a fraud detection system.

In still another embodiment, the account opening system can include a comment system. The comment system can include a free text log that is configured to record entered comments and organize those comments within a list of categories. The comment system can further include an activity log that is configured to monitor, or track, the progress of the account application. Users of the account opening system may consult the activity log to determine the progress of the account application, such as in response to a status inquiry by the customer.

In yet another embodiment, the present invention includes a process for opening an account wherein the entire process is automated and does not require intervention by banking personnel. A customer inputs personal and account information, including an account selection and funding option, into fields on a web site of the system. The web site software applies rules to the information input by the customer, verifying the formatting of the input information, such as the number of digits in a social security number. Additionally, the web site software verifies that information was entered in all of the fields recording information necessary to open the account. The customer information is sent to a fraud system for verification of the customer's identity. Once verification is completed, a rate for the account is determined by a rate determination system using the customer and account information. An account activation system automatically sets up the account and funds the account through an electronic transfer of funds. A welcome kit corresponding the opened account is generated and sent by a package distribution system.

The various aspects of the present invention offer several advantages. Overall, the account opening system provides a more integrated system for recording account applications and activating accounts. The integration and automation enabled by the system increases accuracy and efficiency so as to cut administrative costs. In one aspect where the customer submits information over the Internet and selects electronic funding of the account, the entire process of opening the account can be automated.

In another aspect, wherein an application is pre-filled with customer information and sent to the customer for completion and return, the invention provides a centralized system accessible by various bank personnel including personal bankers, data entry specialists, re-key specialists, mismatch specialists and various managers. The banking personnel can enter data, change existing data, and determine the status of the account application on the same, integrated system. In addition, the personnel can search, view, find and re-key the accounts and account applications on the system. Thus, the personnel do not have to alternate between multiple electronic and paper systems to open the account.

Auditing using the audit system provides a consistent, controlled determination of the percentage of profiles to be audited by avoiding bias and inconsistency of human selection. At the same time, the audit system ensures that entered data is accurate using the mismatch algorithm. The rate system eliminates the need to consult multiple paper rate sheets, thereby reducing errors and increasing speed. Despite the automation of rate determination, rate negotiation may still occur. Additionally, promotional codes may be entered to automatically adjust the interest rate or to credit the account based on specific parameters. The comment system provides a more organized view of the activity in the account by automatically tracking the progress of the application with the activity log and providing categories for text entries using the free text log.

BRIEF DESCRIPTION OF THE SEVERAL VIEWS OF THE DRAWINGS

Figure 1:
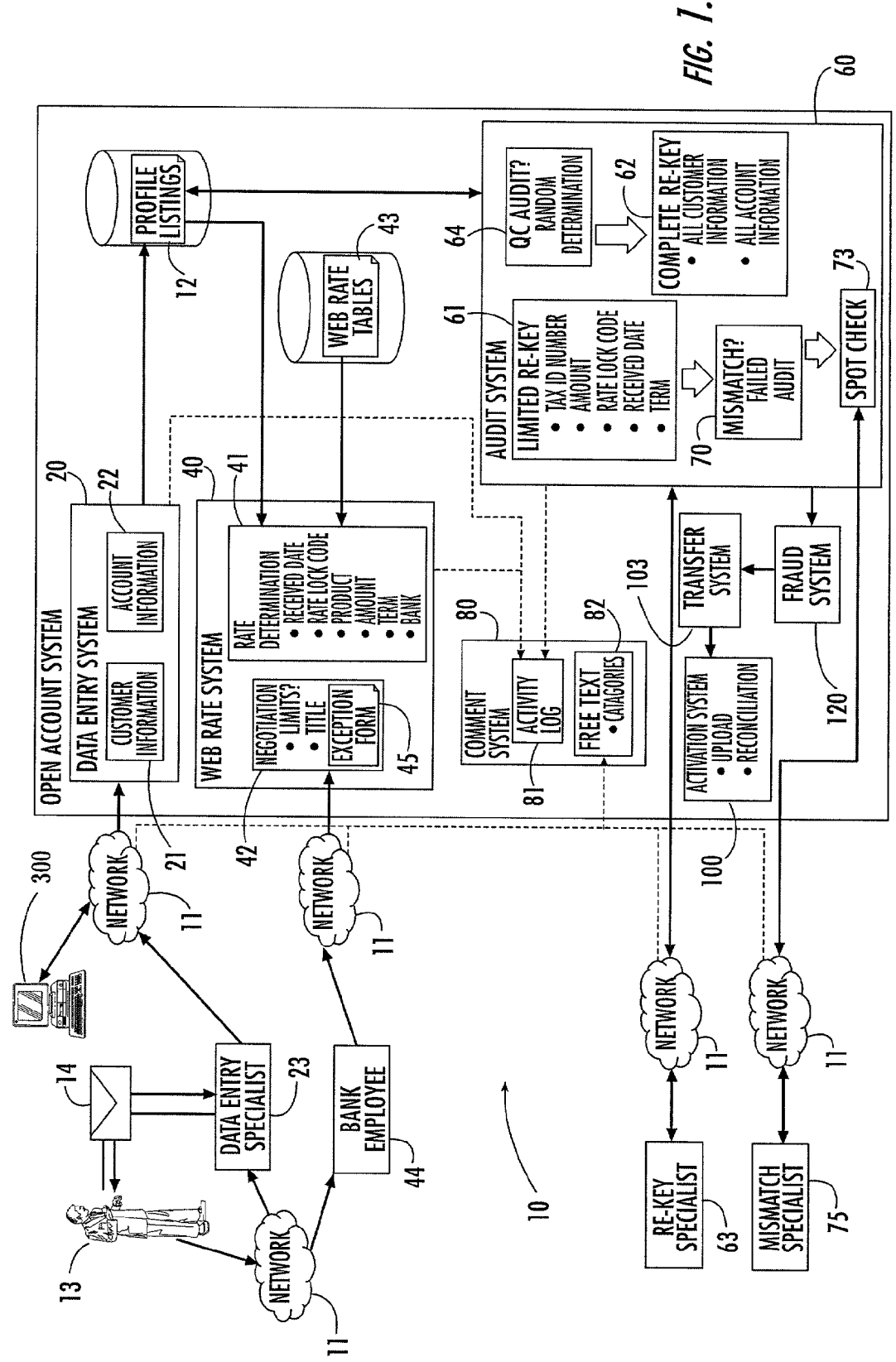
Figure 2:
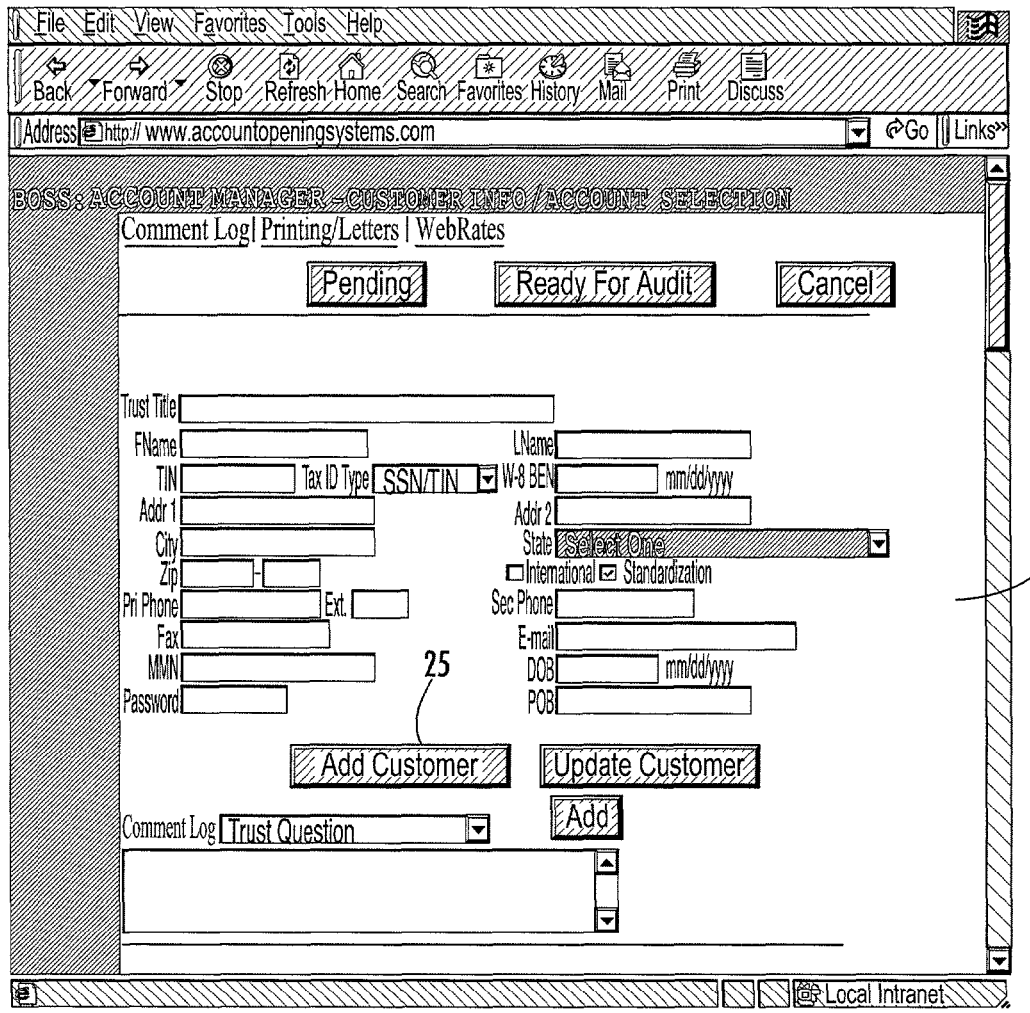
Figure 4:
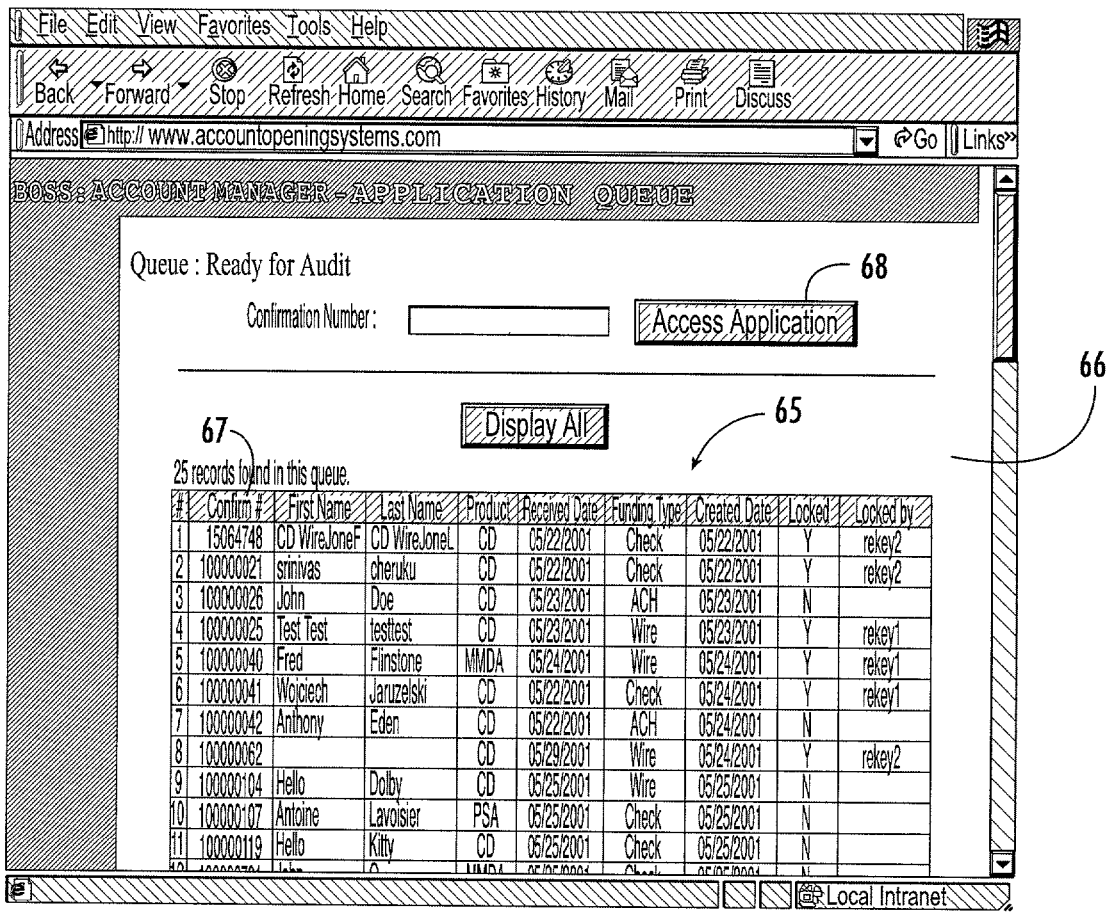
Figure 5:
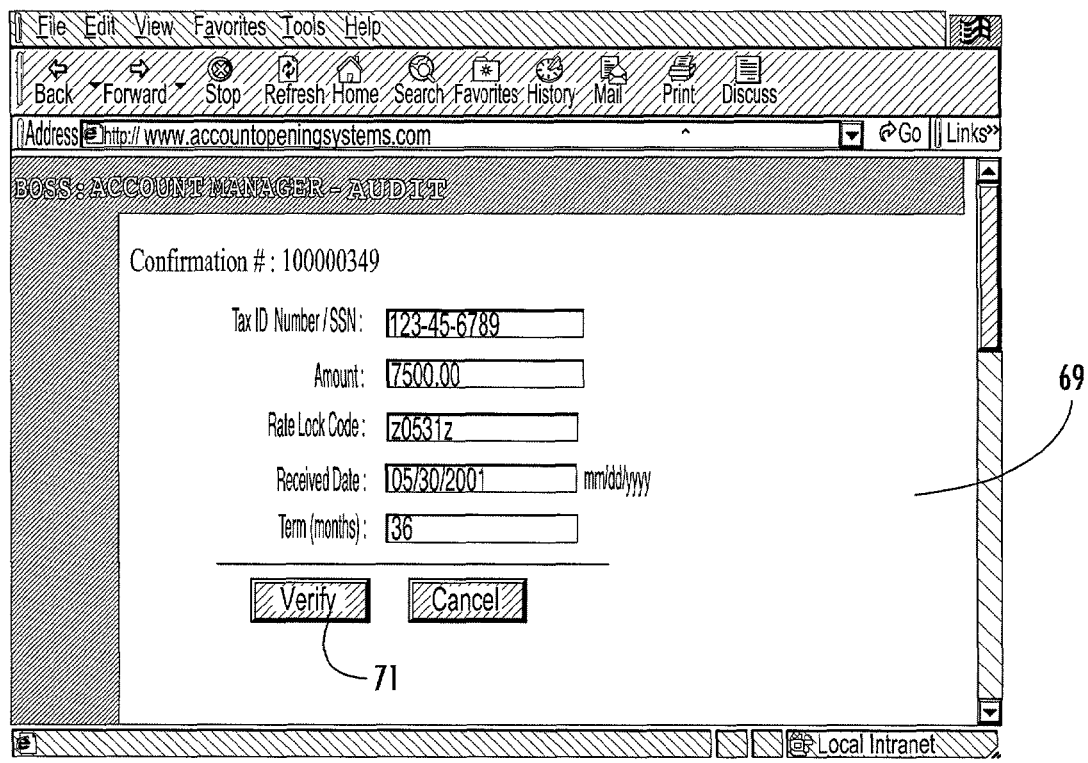
Figure 6:
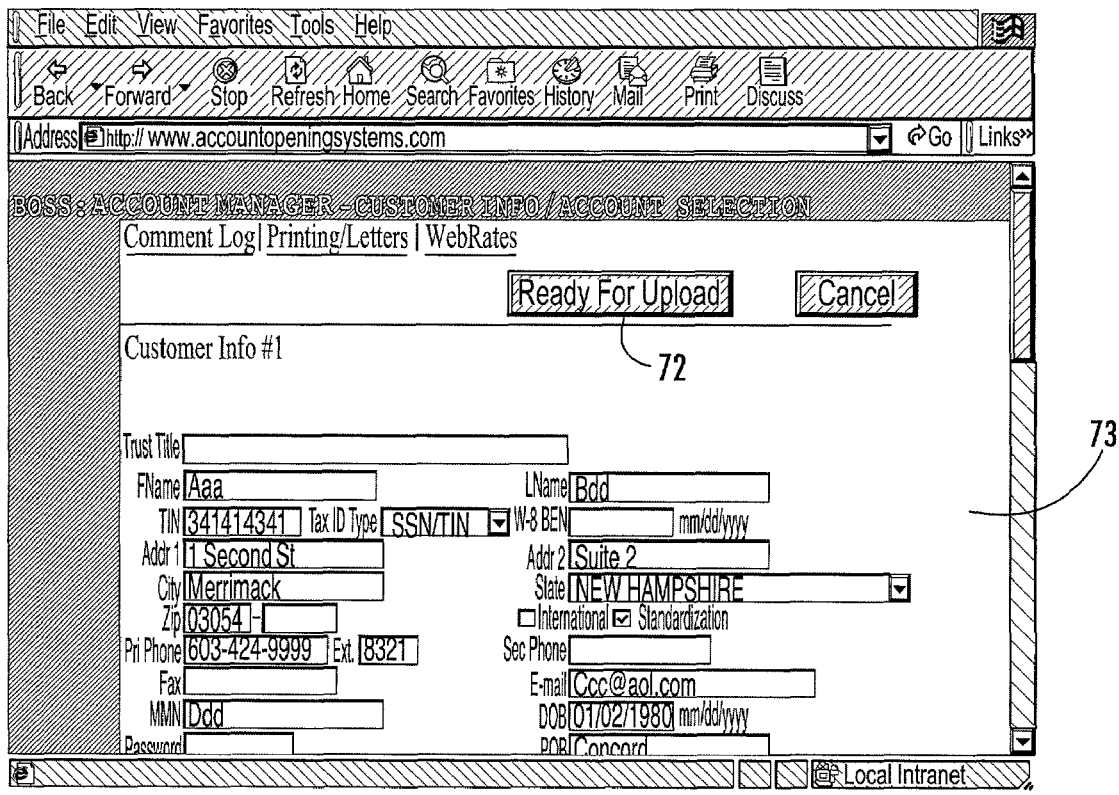
Figure 7:
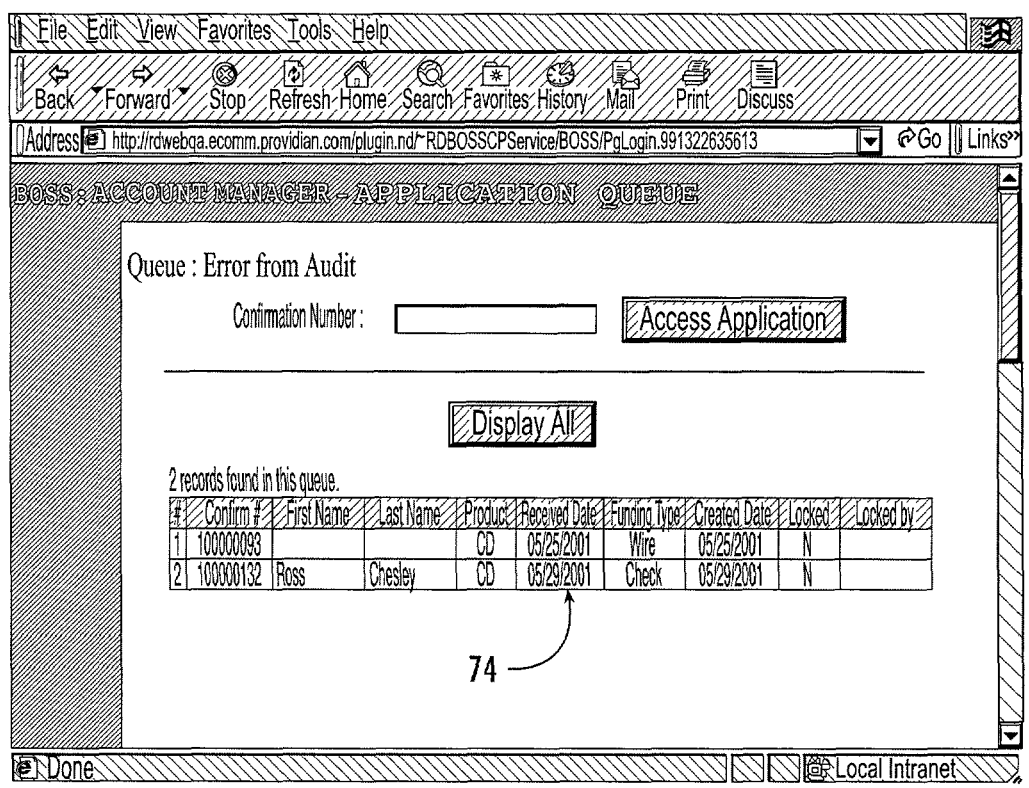
Figure 8:
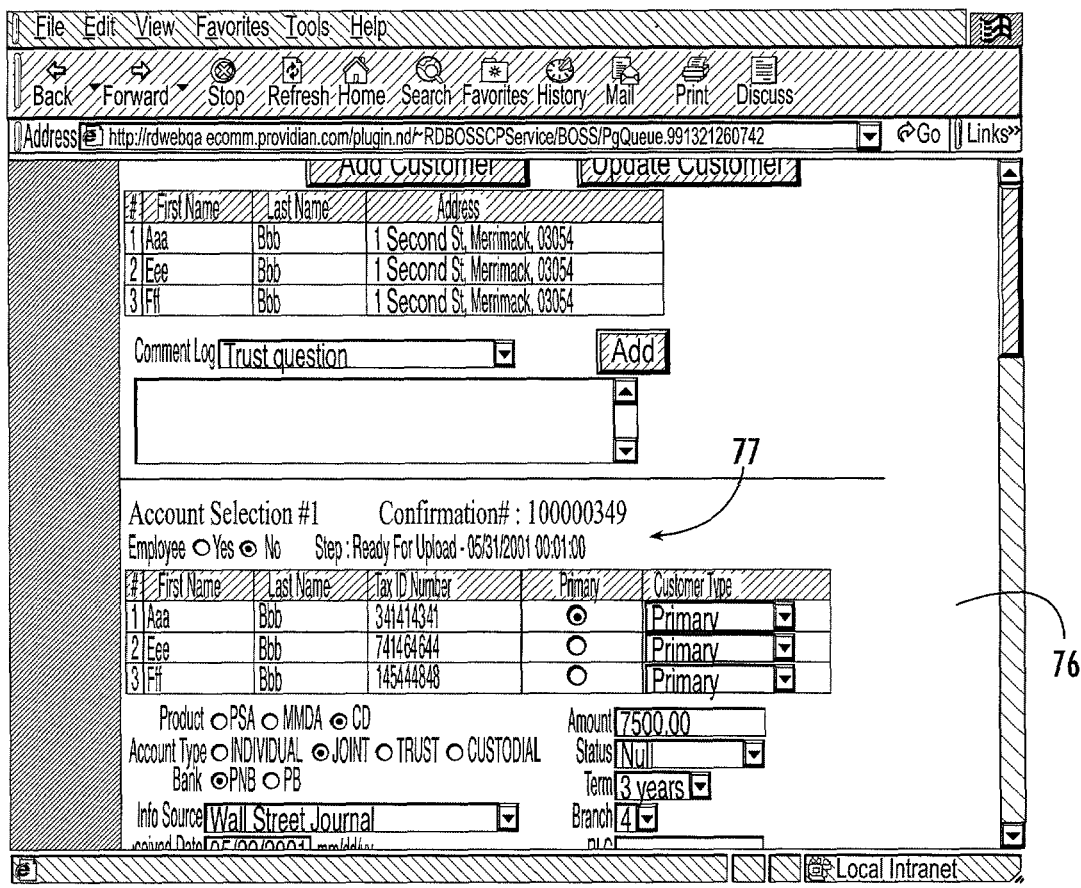
Figure 9:
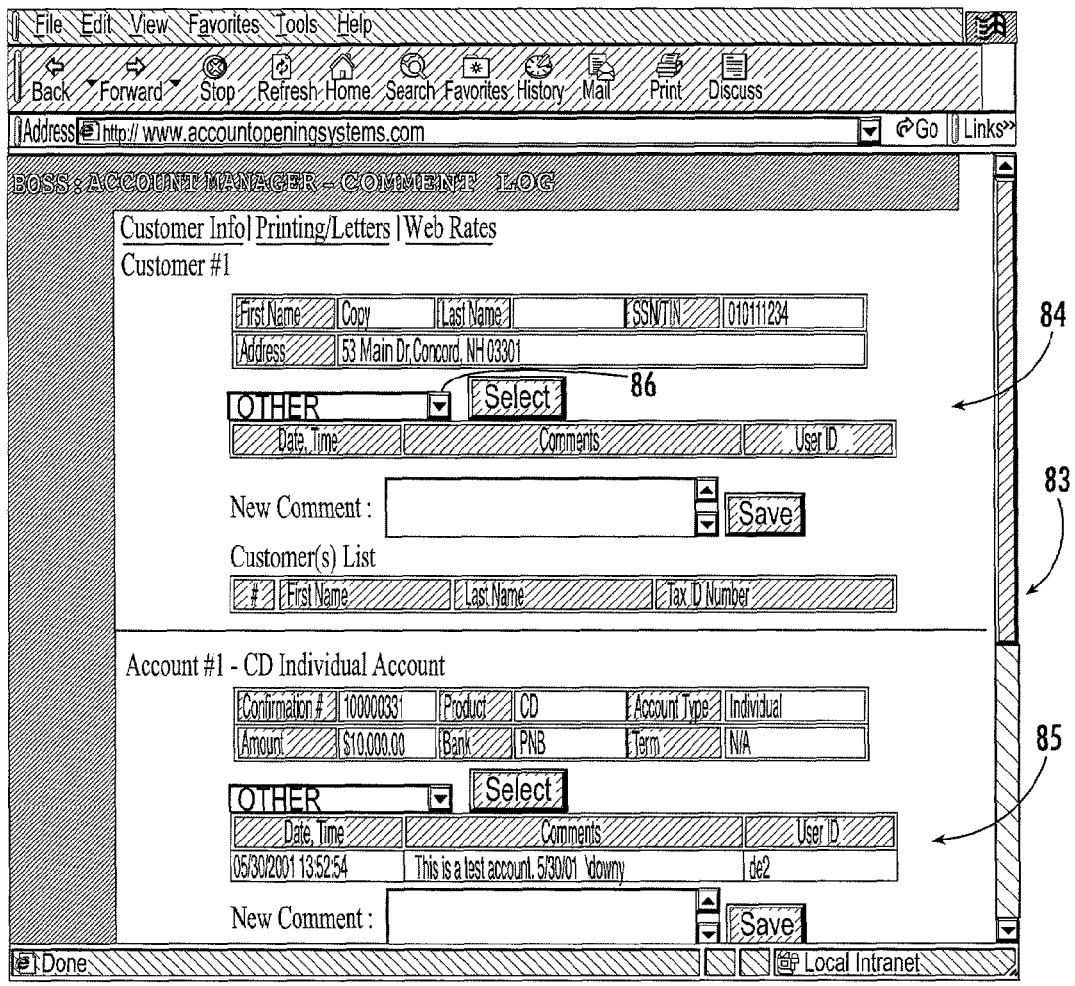
Figure 12:
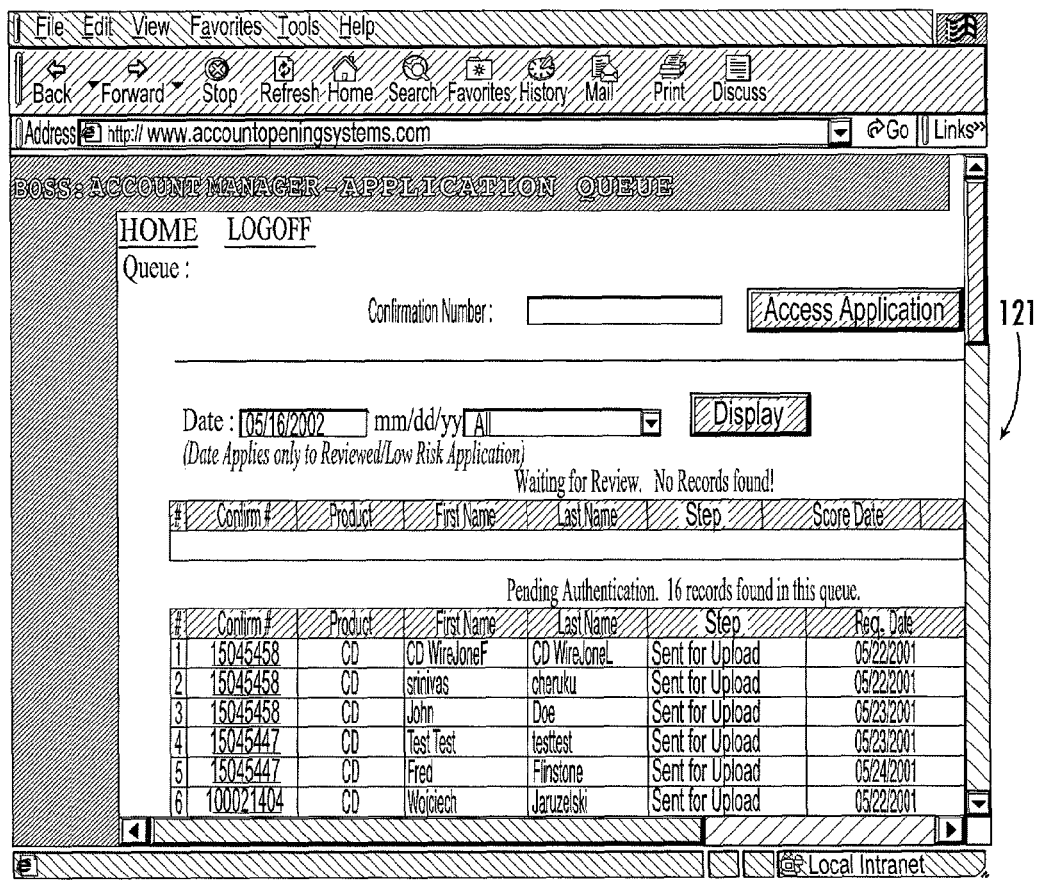
Figure 13:
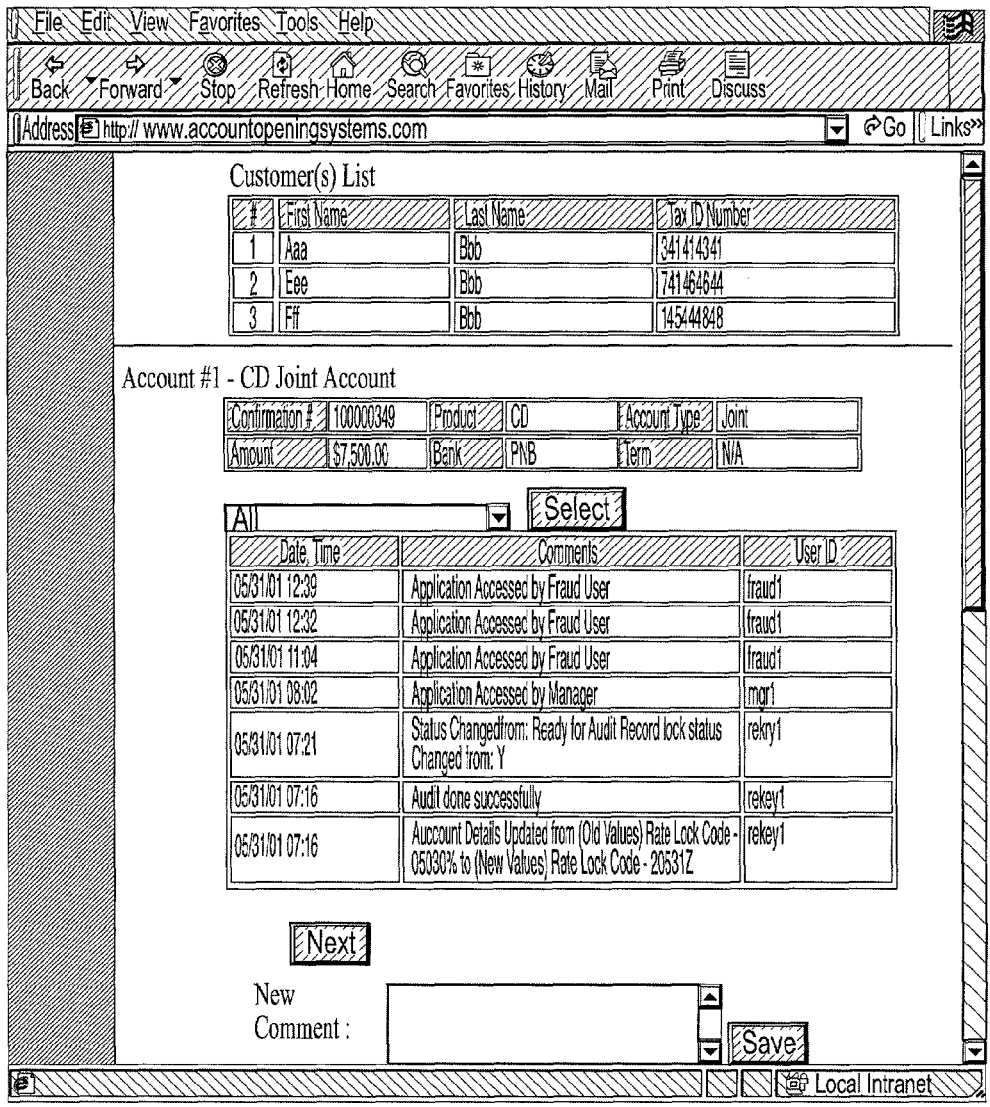
Figure 14:
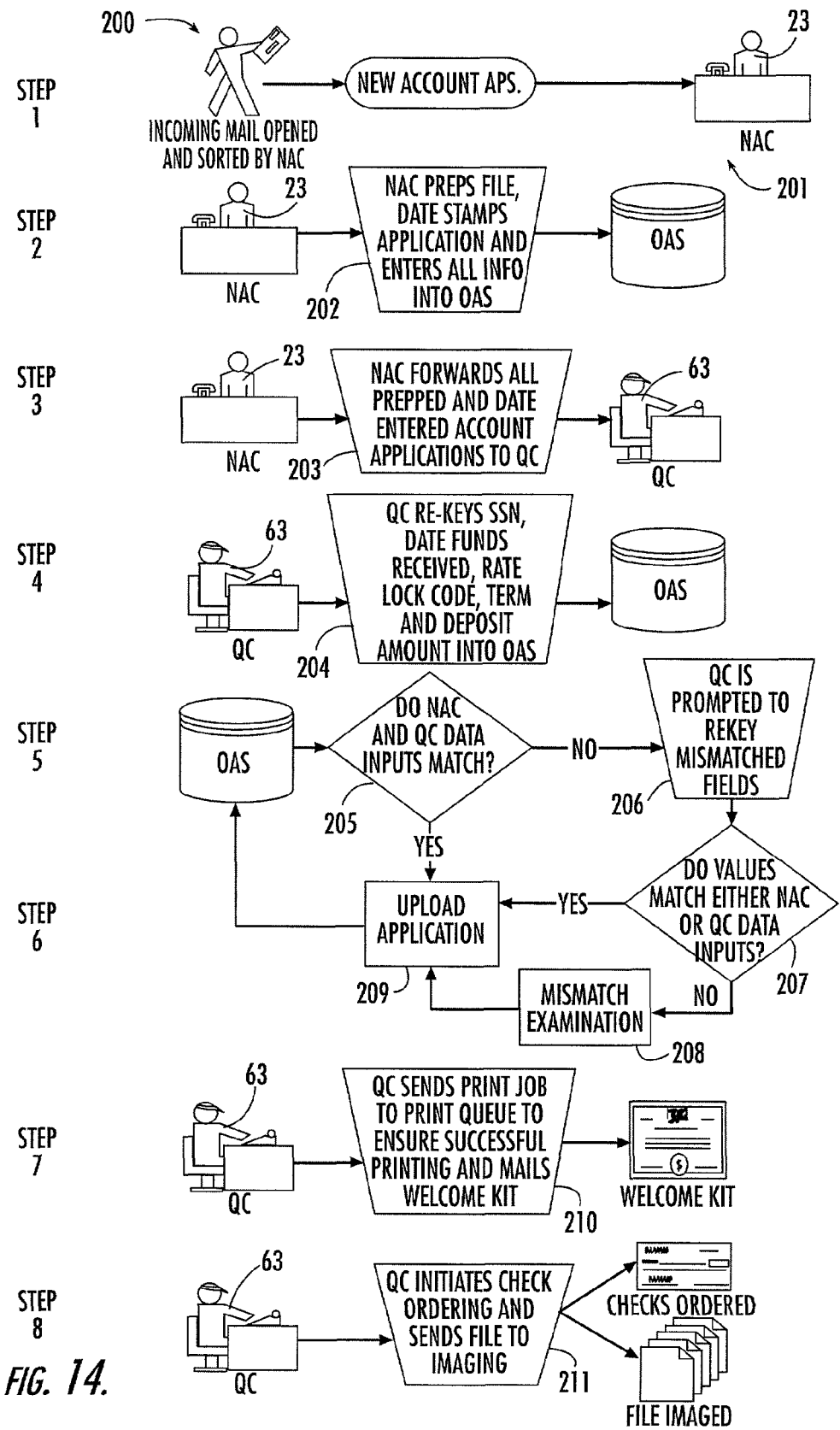
Figure 15:
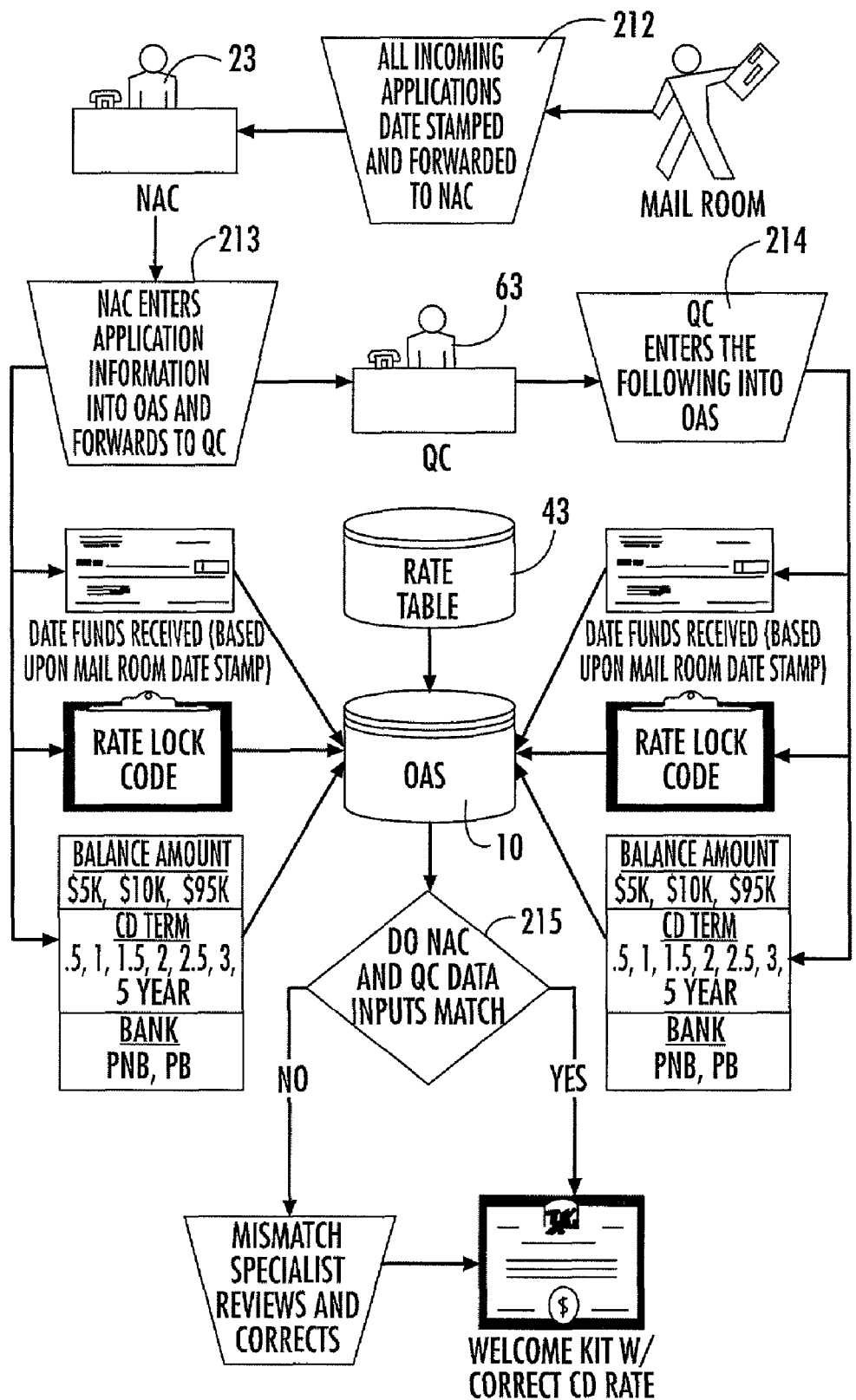

Having thus described the invention in general terms, reference will now be made to the accompanying drawings, which are not necessarily drawn to scale, and wherein:

FIG. 1 is a schematic of an account opening system of one embodiment of the present invention;

FIG. 2 is a customer information panel generated by a data entry system of the account opening system of FIG. 1;

FIG. 3 is an account information panel generated by the data entry system of the account opening system of FIG. 1;

FIG. 4 is an audit management panel generated by an audit system of the account opening system of FIG. 1;

FIG. 5 is a limited re-key panel generated by the audit system of the account opening system of FIG. 1;

FIG. 6 is an audit spot-check panel generated by the audit system of the account opening system of FIG. 1;

FIG. 7 is a mismatch queue panel generated by the audit system of the account opening system of FIG. 1;

FIG. 8 is a manager panel generated by audit system of the account opening system of FIG. 1;

FIG. 9 is a comment log panel generated by a comment system of the account opening system of FIG. 1;

FIG. 10 is a print queue panel generated by a printing system of the account opening system of FIG. 1;

FIG. 11 is a print report panel generated by the printing system the account opening system of FIG. 1;

FIG. 12 is a fraud investigation queue panel generated by a fraud system of the account opening system of FIG. 1;

FIG. 13 is an activity log page of the comment system of the account opening system of FIG. 1;

FIG. 14 is a flow diagram of an account opening process of another embodiment of the present invention; and FIG. 15 is a flow diagram of a rate determination process of the account opening process shown in FIG. 14.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

According to one aspect of the present invention, a system for opening an account 10 ("account opening system") that is electronically accessible over a network 11 by various bank employees on behalf of a customer 13 seeking to open an account is provided, as shown in FIG. 1. Alternatively, the customer may access the system 10 directly over the network 11 using a customer computer 300. The account opening system 10 includes a data entry system 20 for collecting customer and account information, a web rate system 40 for determining a rate for the account, an audit system 60 for confirming the accuracy of the customer and account information, a comment system 80 for tracking the progress of the application and for recording and organizing text entries by various operators of the system. Preferably, the systems of the account opening system 10 and their respective subsystems as described below are web and database software residing on one or more computer servers which are accessible by users over the network.

The data entry system 20 includes customer information 21 and account information 22 systems. Information may be submitted by the customer 13 in several ways. For instance, the customer may enter personal and account information using the customer computer 300 which directly accesses the data entry system 20 over the network 11. Advantageously, the information originally provided either over the internet or the telephone does not have to be re-keyed by the data entry specialist into the data entry system 20. Alternatively, the customer may contact a personal banker 44 by telephone and provide customer information that is entered into the data entry system 20 and used to pre-fill an application 14. The pre-filled application is mailed to the customer 13, completed by the customer and returned to the data entry specialist 23 for entry of the remaining data. When the signed application is received, the data entry specialist does not have to type in information already captured by the system 20. However, the data entry specialist can modify any data in the system as needed based on the information provided in the application. In another alternative, the customer 13 may acquire a blank application 14 without pre-filled data, fill in the customer and account information and then mail the application to the data entry specialist 23. The aforementioned methods of communication are meant to be exemplary and other types of communication can be used to submit the customer and account information to the data entry system 20 and still be within the scope of the present invention.

Both the customer and account information systems 21, 22 preferably prompt entry of the information by the customer 13 or data entry specialist 23 using a graphical user interface having a plurality of graphical panels. The term "graphical user panel" is used herein to describe any computer-generated graphical image or collection of images, such as a window, a collection of input and output fields, an entire web page or portions of several web pages on a computer screen. The term network encompasses intra-connected and interconnected electronic communication systems such as the Internet, intranets or a public telephone network.

Regardless of how the information is acquired, the customer information system 21 prompts the data entry specialist 23 or the customer 13 with a plurality of data fields on a customer information web page panel 24 that are each labeled with the type of information desired for entry, as shown in FIG. 2. While the information requested by the customer information system 21 may vary depending upon the application, the information requested by the customer information system 21 of the illustrated embodiment includes a trust title (if applicable), a first and last name of the customer 13, date of birth, tax identification number (social security number or employer ID number), an address, including city, state and zip code, telephone number, facsimile number, email address, mother's maiden name and place of birth, W-8 BEN and a password. The panel 24 also includes an add customer button 25 for when the customer is new, or an update customer button for when the customer has an existing profile 26 that is being updated. Once the information has been entered by the data entry specialist 23, the specialist hits the add button 25 and the customer information is stored as part of one of a plurality of profile listings 26, such as in a file on a storage drive, as shown in FIG. 1. Different types or amounts of information may be requested from the customer depending upon the minimum needs for the type of account and the banking institution.

The customer information system 21 may be further configured to review the customer information in real time as it is input and to validate the customer information using a predetermined set of rules. These rules include edits of certain data-entry fields to ensure proper formatting of the customer information as it is entered. For instance, the customer information system may refuse to accept a social security number entry that does not include nine digits. Other verification includes matching the zip code to the city listed in the address information. Additionally, the system verifies that the customer 13 (or data entry specialist 23) entered information in selected fields required to open the account. Preferably, the required information includes a customer name, social security number, physical address, mother's maiden name and birth date. Such required information, however, may be varied depending upon the bank's needs or regulations applying to the type of account being opened.

Similarly, the account information system 22 prompts the data entry specialist 23 (or the customer 13 directly) using an account information web page panel 27 (which in the illustrated embodiment is part of a single web page shared with the customer information web page panel 24) having a plurality of labeled fields, as shown in FIG. 3. The information requested or displayed by the account information system 22 may also vary depending upon the application, but in the illustrated embodiment includes an account type selection (personal savings account, certificate of deposit or money market deposit account), a deposit amount, another account type selection (individual, joint, trust or custodial), a bank selection, a term, an information source, a bank branch selection, an application receipt date, a rate lock code, a negotiated rate and annual percentage rate, an interest payment method, a money market deposit account number (if applicable), an interest payment frequency, a federal withholding code, method of funds receipt (wire or check) and a list beneficiaries.

The term dictates the amount of time before the principal is available on the account, typically on a certificate of deposit. The information source is a description of where the customer 13 learned of the opportunity to open an account. The interest payment method instructs the bank as to where to credit the interest from the account including whether to add the interest to the principal, send it via a check to the customer, or transfer it to a money market deposit account. Drop down boxes may be used to identify how each account holder is to be titled, such as primary account holder, joint account holder, minor, custodian or trustee. Optionally, an add beneficiary button allows the addition of a first and last names of additional beneficiaries. Similar to the customer information system 21, the account information system 22 can verify the information as it is entered, such as the account number, to ensure proper content and formatting.

Account address fields 29 may also be included which allow the data entry specialist 23 to input a primary address as a destination for correspondence regarding the account. The address is generally input using a drop-down box which defaults to the primary address selection. Other, alternative addresses may also be input using the account address fields. Selection of the correspondence address may also be completed by designation of one of the account holders input in the data entry system 20. Once the account holder is selected, that account holder's address commonly pre-populates the fields 29. Regardless of how the fields are filled, the new address can be added by selecting the add address button 30, or in the case of a change in address, an update address button 31. Once the account information is collected, the information is added to the profile listings 26 with its corresponding customer information. Similar to the customer information, the required account information may be varied depending upon factors such as the type of account or the needs of the banking institution.

The audit system 60 includes a limited re-key system 61 and a quality control ("QC"), or complete re-key, system 62. The limited re-key system 61 is implemented by a re-key specialist 63 who performs a limited re-key of 5 of the most important information fields, the tax identification number, the deposit amount, the rate lock code, the receipt date and the term into a limited re-key page 69, as shown in FIG. 5. Due to the importance of the information in the limited re-key, it is preferably performed on all mailed applications. However, in cases where the customer 13 has submitted customer and account information directly over the Internet, and has requested an electronic transfer of funds, even the limited re-key may be avoided. Limited re-key may still be required for the account information, especially the deposit amount and receipt date, for accounts opened directly over the network 11 by the customer but funded by check. The information required to be re-keyed by the limited re-key system 61 may be varied based on the bank's consideration of what information is the most important. After the fields have been filled, the re-key specialist invokes a mismatch algorithm 70 by selecting a verify button 71. The mismatch algorithm 70 compares the data entered by the re-key specialist 63 with the earlier entries of the same information by the data entry specialist 23.

If the re-keyed information matches the originally entered information, an audit spot check page 73 containing the customer and account information panels 24, 27 is generated by the audit system 60. The spot check page 73 is the same as that generated by the data entry system 20 with the exception that the page includes an upload button 72 and is pre-populated with the previously entered information, as shown in FIG. 6. Generation of the spot check page 73 allows the re-key specialist 63 to confirm the accuracy of any desired additional customer and account information. Once the accuracy of the information is confirmed, the re-key specialist may select the upload button 72 to upload the application.

If there is a mismatch, the re-key specialist 63 is given a second opportunity to enter the data by cycling back to the re-key page 69. If the mismatch algorithm 70 fails to match the re-keyed information a second time the account application profile 26 is forwarded to a mismatch queue 74, as shown in FIG. 7. The re-key specialist 63 is not notified of the error on the second attempt. The mismatch queue 74 contains listings similar to those of the audit queue 65, allowing selection of the account application to audit with entry of the confirmation number and selection of the access application button 68 or with selection of the confirmation number field 67. A mismatch specialist 75 selects the account application profile listing 26 and the customer and account information are presented on the audit spot check page 73, as shown in FIG. 6. The mismatch specialist 75 performs a complete review of the account application attempting to identify what was missed by the re-key specialist 63. If the error is found, the mismatch specialist corrects the error and uploads the application by selecting the upload button 72.

Only a portion of the account application profiles are selected for a complete re-key of all customer and account information (i.e., a quality control audit) using an audit determination algorithm 64. The audit determination algorithm includes a counter which sequentially numbers each of the profile listings 26. The numbers assigned to the profile listings are generally bounded by a lower limit and an upper limit, such as 1 and 100, respectively, in one embodiment. For profile listings in excess of the upper limit, the algorithm may restart again at the lower limit and increments until reaching the upper limit again. The audit determination algorithm 64 includes a random number generator that randomly generates a number within the range bounded by the lower and upper limits. The number that is randomly generated corresponds to the number identifying one of the profile listings and effectively selects the profile listing for audit. Optionally, complete re-key audits may also be performed on opened and funded accounts wherein the randomly generated number corresponds to the account number or a number associated with the account number.

Random number generation is repeated for a number of cycles (with a separate random number generated and a corresponding profile listing identified during each cycle) corresponding to the percentage of desired account applications to be audited, such as 5% for ongoing operations, or 100% (all of the applications) for initial operations. For instance, when an audit of 5% of account applications is desired 5 random numbers are generated for each group of 100 sequentially numbered account application profiles. The random number generator is generally reset each time the counter returns to the lower limit, or the percentage of profile listings to be audited is changed. A complete audit of 100% of the account applications may be desired due to the newness of the system or a new data entry specialist 23. Preferably, for security reasons no users below the level of the systems administrator should be able to determine which account will be subject to audit.

Account application profiles may be listed in an audit queue 65 as part of an audit management web page 66, as shown in FIG. 4. Each listing in the audit queue 65 generally includes a confirmation number, a first and last names, a product designation, a receipt date, a funding type, a creation date, an indication of whether the account is locked and who locked the account if it is locked. An account or account application is locked if another user has it open, or if it has been sent for re-key or upload. The audit management web page is accessible by the re-key specialist 63 after signing on over the network connection 11. The re-key specialist can select an application profile listing 26 by either entering the confirmation number corresponding to the application profile into a confirmation number field 67 and selecting an access application button 68, or by selecting the account's confirmation number in the audit queue 65. Once the profile listing 26 is selected for audit a page is opened which includes all of the customer and account information, which the re-key specialist 63 verifies based on the account application 14. If any fields are incorrect, the re-key specialist can re-enter those fields. The mismatch algorithm 70 would then be employed, as above, to detect any errors.

Optionally, the audit system 60 may also include another audit level, generally accessible by a manager, which includes a manager web page 76. The manager web page presents the same customer and account information to the manager as the audit spot check page 73 (shown in FIG. 6), except that it includes an application step listing 77, as shown in FIG. 8. The application step listing reports the status of the selected account application, such as whether the account application listing is "ready for upload." On the manager web page 76 the manager is free to audit and update the application profile listing 26. The application step listing 77 may also appear for other bank employees, such as the data entry, re-key and mismatch specialists, as desired.

The web rate system 40 includes a rate determination system 41 and a rate negotiation system 42. The rate determination system 41 obtains account information from the account information system 21 via each of the profile listings 26. The rate determination system 41 uses the account information to consult a plurality of electronic rate tables 43 and determine a rate for the account. More particularly, the rate determination system 41 uses the application date, received date, the rate lock code, the account type selection, the amount, the term and the selected bank as indices to determine a final rate which is then recorded as part of the profile listing for later auditing and upload.

The application date is used as the start date and the received date is used as the end date for navigating the rate tables 43 and returns the highest rate available during the period. The rates in the tables 43 vary by the type of account such as a certificate of deposit, a money market deposit account or a savings account. The account types may also include subgroups such as a "mini" or "jumbo" or "super jumbo" certificate of deposit that depend upon the amount of funds deposited.

The terms are generally on a monthly or yearly basis for certificates of deposit, such as 6 months, a year or two years. For a certificate of deposit, the term defines the amount of time the principal is inaccessible. In another example, the account may be an off-line account or an internet account which may have different rates of return. The rate tables 43 are updated on a rolling basis, typically weekly, by a treasury department of the bank. Preferably, the rate tables are copied automatically from a separate system operated by the treasury department which reduces transcription errors and entry time. Updates of the rate tables are preferably generated in a report which is then checked for accuracy by a quality control person. The use of rate locks are typically limited to fixed-interest rate accounts, such as certificates of deposit. Other account types, such as personal savings accounts and money market deposit accounts, have varying interest rates and therefore typically receive the interest rate at the time the application and finds are deposited.

Optionally, the rate negotiation system 42 allows the rates awarded to differ from those determined from the rate tables 43 by the rate determination system 41. Rate exception parameters are preferably produced by the same treasury department that produces the rate tables 43, and are included as data that can be captured from the rate tables. Parameters for rate exceptions include the number of basis points, whether the customer 13 is a new or existing customer, whether the deposit amount is over a minimum amount and the term is over a minimum amount. Other parameters or limits could be used depending upon the objectives of the bank, such as emphasizing larger accounts or longer term accounts. During a negotiation, a bank employee 44 confers with the customer 13 over the network 11, such as by telephone, and the customer requests a higher rate, as shown in FIG. 1.

The bank employee 44 considers whether the customer falls within the exception limits and awards a rate increase by attempting to enter the increase into the account opening system 10. If the rate exception is within the limitations, the rate negotiation system 42 allows the negotiated rate to take effect and the bank employee 44 adds a note to the comment system 80 describing the rate change. Otherwise, the rate exception is added to a rate exception form 45 for later review by other banking personnel, such as the treasury department. The account opening system 10 may capture all rate exceptions and adds them to a report for evaluation, such as to inform the bank on the latest exception trends. Optionally, the rate exception limits may depend upon the title of the bank employee. For instance, the data entry and re-key specialists 23, 63 can be limited to no more than a 10 basis point increase while the mismatch specialist 75, or other manager, may be limited to a 25 basis point increase. In another option, the rate can be negotiated directly by the customer 13 with the rate negotiation system 42 over the network 11.

The comment system 80 includes an activity log 81 and a free text log 82. The activity log 81 is capable of identifying the movement of each user, and tagging where the user of the account opening system 10 has been during each session, as can be seen by its connection to the other systems shown in FIG. 1. Every time a user views an account, an entry is made into the activity log 81 of that account with the user's identification, and date and time of the entry. As shown in FIG. 13, the activity log 81 lists the timing and identity of persons accessing the account in an activity log page 87.

Tagging of movement through the system allows a quick determination of the progress of the account application. Each of the applications progresses through a series of steps that can be listed and include application pending, application completed, sent for fulfillment printing, funds received, exception, ready for audit, audit failed, pending authentication, under investigation, declined, sent to the automated clearing house, ready for upload, welcome kit printed, account activated, account withdrawn by customer and account closed. Optionally, the user may enter comments in addition to the automatically recorded entries or steps.

The free text log 82 allows the entry of text comments while on either the customer information web page 24 or the account information web page 27, as shown in FIGS. 2 and 3. Comments entered into the free text log 82 can be viewed by selecting a "comment log" hyperlink that connects to a separate comment log page 83, as shown in FIG. 9. The comments are separated into two groups, a customer level panel 84 and an account level panel 85. Each comment is generally listed with a date and time of entry, the comment, and the identification of the user entering the comment. The comment can be classified within a category as selected by the user for better organization by selecting a drop-down category identifier menu 86. The categories can include, for example, renewal instruction, address change, account closure, fraud suspect, duplicate certificate of deposit requested, rate negotiation, rate lock code, facsimile request, escalated call, interest calculation, statement inquiry, trust question, term question, request POA papers, question on titling, lacking tax id number, interest payment method question, check not negotiable question, beneficiary question, fax request, duplicate CD requested, or other. Optionally, each category can expire in a specified period of time so as to not hold data longer than necessary. Once the data has reached a certain age, it may be archived on a separate database for retrieval by a fraud system or for internal audit purposes.

Prior upload of the account for activation, a fraud system 120 formats the customer information and sends a file with the customer information to a third-party credit bureau (e.g., RISKWISE, St. Cloud, Minn.) that compares the data against demographic credit report data and verifies the identify of each customer 13. The credit bureau returns a fraud score and specific data about each piece of customer information. This score and the specific data is passed to a fraud queue 121 which is accessible by a fraud specialist 122 and operates similar to the queues described above and as shown by FIG. 12. Once an account is selected for investigation, the account information is displayed on a fraud investigation page listing all of the customer and account information. The fraud specialist 122, upon detecting possible fraud, can flag the account application by selecting "yes" on a fraud selection field 123 which originates on a "no" default selection.

Subsequent to a successful audit by the audit system 60, the entered account application 14 is uploaded to an account activation system 100 for reconciliation. The account activation system may be an integrated part of the open account system 10. Alternatively, it may be a separate system, such as a server running commercially available banking software (METAVANTE of Milwaukee, Wis.) to which the account activation system provides properly formatted account applications. In addition, a transfer system 103 may also be used to properly send the account and customer information, such as TRANSFER CONNECT 3.0 or FINANCIAL CONNECT 4.0 software. The transfer system converts customer and account information from the various web pages and systems of the account opening system 10 to a format understandable by the account activation system 100.

FINANCIAL CONNECT, which can optionally be integrated into the open account system 10, has the advantage of being able to send and receive data to the account activation system 100 on an individual transaction basis. This allows the status of the account to be verified almost immediately, as opposed to TRANSFER CONNECT which is restricted to multiple batch submissions to the activation system. Such batch processing creates a time lag between occurrence and visibility of the transaction. Integration or use of FINANCIAL CONNECT as the translation system, therefore, will allow real-time inquiry into the transaction history of the account including a listing of credits and debits.

For an upload before a daily cutoff time (such as 4 PM), the account is opened, the deposit amount is credited to the newly opened account and the deposit amount is debited from the funding account through a clearinghouse on the same day. For account applications completed after the daily cutoff time, there are two preferred alternatives. In one alternative, the entered account application 14 is held in the open account system 10 until the next day. On the next day, the account application is uploaded to the account activation system 100 for simultaneous funding and clearance of the debit. Interest on the deposit amount is credited from the date of receipt of the application, even though clearance and funding occur the next day. In the other alternative, the open account system 10 uploads the account application 14 on the same day wherein the deposit amount is credited, but the debit is not cleared, producing a one-sided entry in the general ledger. Clearance of the debit occurs the next day, with the effect that the amount of time to clear the entry is reduced by one working day. Immediate upload to the activation system 100 also has the advantage that the bank personnel can continue to prepare other non-clearance related materials, such as printing of reports and welcome kits that can be mailed to the customer 13 the next morning. In another option, the user is able to select the desired reconciliation alternative.

The account may be funded in several different ways including mailing a check, wiring the deposit amount through electronic funds transfer (EFT), debiting through an automated clearing house (ACH) or an internal transfer from another account of the same bank. Wired electronic funds transfers are placed in a federal suspense account until the new account is opened. Opening of the account offsets the funds in the suspense account, preferably within 5 business days. If the customer 13 chooses to fund the account electronically, the system automatically sets up and funds the account upon notice that the transaction was completed successfully by the clearinghouse, thereby avoiding additional keying by the banking personnel.

The open account system can also include a printing system which includes a print queue web page 116, as shown in FIG. 10. The print queue web page displays each document to be printed, or that has already been printed, by listing confirmation number, account number, funding method, product (account type), type of document, request date, status and printer identification. The web page may also include selections for reprinting a document and for confirming successful printing of individual documents. Different printing statuses include printed, failed printing and ready for printing. Documents can be sorted and selected for printing based on status, date of entry, product or funding method. The sort is initiated by filling the appropriate fields at the top of the print queue web page and selecting a "get application" button 117. Once various documents have been printed for submission to the customer 13, the successfully printed documents are summarized on a print report page 118, as shown in FIG. 11. The print report page allows the bank personnel to match printed documents with the report and to reprint those documents which failed to print. The print report page also allows users to reprint single document or entire fulfillment and welcome kits upon demand. In the case where electronic funding is selected, reports and welcome kits can be printed automatically following upon notification from the clearing house that the transaction was completed successfully.

The open account system 10 of the present invention is also expandable through the integration or addition of other types of tools and systems. A fulfillment system may be used to track generation, printing and delivery of fulfillment packages. The fulfillment packages include blank or pre-filled account applications and associated information that are sent in response to customer inquiries. A customer and account maintenance system may be used that incorporates maintenance requests, including a queue of maintenance requests that cannot be handled by lower level (first year) bank employees. A promotional code system provides an efficient way to determine the effectiveness of promotions and includes a promotion selection field to one of the various web pages. The promotional code system can increase the interest rate, record and compile lists of promotional codes used on a periodic basis for printing and review.

A calculator tool can be included which is configured to calculate "what if" scenarios, such as how much and how frequently the customer 13 needs to deposit funds to reach a specific balance under the calculated interest rate. In addition, the calculator tool can determine the amount of interest earned for various periods, such as daily, weekly, monthly, quarterly or the entire term.

An opt-out request system allows the customer to stop the bank from sharing private information internally or with outside companies. When customers express a desire to not be sent promotions, they request placement on a "do not promote" list. A do not promote system can be included in the open account system 10 that allows such requests to be recorded and compiled in a report. The do not promote system generates a flag on the customer information and account information panels 24, 27 that alerts users to the customer's request.

A user profile reporting system monitors the activities of various bank personnel within the open account system 10, such as call volumes, calls requiring management assistance, number of new account applications completed and number of audits. A profile maintenance system creates the user profiles which defines the users' range of access within the open account system and includes data entry, re-key, mismatch, audit, manager, printer and personal banker profiles. The profile maintenance will restrict access to location and activity, such as only making inquiries or limitations on editing various fields. Managers typically have the ability to add, change or delete such profiles.

The account opening system 10 may also include a search system that has the ability to search and retrieve customer and account data using various search terms such as the confirmation number, account number, or the customer's first and last name and social security number. Optionally, such a search can be run across several different banks.

FIG. 14 broadly illustrates use of the open account system 10 of the present invention to open and fund the account. Each incoming account application 14 is opened and sorted 200 by the new account center (NAC) personnel and is delivered 201 to the data entry specialist 23. The data entry specialist prepares 202 the file by date stamping the application and entering customer and account information 21, 22 into the data entry system 20 of the open account system (OAS) 10. The account application 14 is forwarded 203 to the re-key specialist 63 of the audit operation for limited re-key for quality control.

The re-key specialist 63 reenters 204 the tax ID number, date of funds receipt, rate lock code, term and deposit amount into the audit system 60 of the open account system 10. The open account system then runs the mismatch algorithm 70 and compares 205 the data entered by the data entry specialist 23 and the re-key specialist 63 to determine if the data match. If the data match, then the application is uploaded 209 for activation and reconciliation by the activation system 100. If the data does not match, the re-key specialist is prompted 206 to re-key the mismatched fields. The second re-key is compared 207 to the entries by the data-entry specialist and re-key specialist's first attempt. If the second re-key matches either the first re-key entry, or the original entry by the data entry specialist 23, then the application is uploaded 209 with the matching entries. If the second re-key does not match, the application 14 is forwarded for a mismatch examination 208 by the mismatch specialist 75. If approved by the mismatch specialist, the application is uploaded 209. Once the application has been uploaded, the welcome kit is printed 216 and then mailed 210 to the customer 13. In addition, the re-key specialist orders checks 211 and sends the paper file to imaging for archival purposes.

FIG. 15 illustrates use of the open account system 10 to determine an interest rate for a certificate of deposit (CD). Incoming applications are date stamped 212 and forwarded to the data entry specialist 23. The data entry specialist enters 213 the application information into the web rate system 40 of the open account system 10 and forwards the application to the re-key specialist 63. The re-key specialist also enters 214 the application information into the web rate system 40. The data entered by both specialists pertinent to rate determination includes the date the funds were received, the rate lock code, the balance amount, the term of the CD and the bank. A comparison 215 is performed between the data entered by the different specialists using the mismatch algorithm 70. If the data match, then the account information is uploaded and the welcome kit with the correct CD rate is printed 216 and distributed. If the data do not match, the mismatch specialist 75 reviews 217 and corrects the information before printing 216 and distribution of the welcome kit with the awarded interest rate recorded thereon.

In another embodiment where the customer provides personal and account information over the internet, the account opening system 10 removes the need for the data entry and re-key specialists altogether. The customer information system 21 and account information system 22 capture the information directly input by the customer 13. The rate decision system automatically determines the correct rate based on the application date, account type, amount, rate lock code and promotional code. The fraud system 120 retrieves the information directly from the open account system 10 to verify the customer's identity.

If the information is not suspect, the information is passed to the account activation system 100. If the customer 13 selects to fund the account through electronic funds transfer, the account activation system 100 opens the account, funds the account and the printing system prints the welcome kit to be mailed. If the customer 13 opts to fund via check, the account activation system 100 holds the account information until the check is received. Once the data entry specialist enters the check information, the system proceeds to open the account, fund the account and the printing system prints the welcome kit. Therefore, the account opening system 10 provides significant efficiencies by removing bank personnel from the process and by not opening accounts that are never funded.

The present invention has several advantages. Overall, the account opening system 10 provides a more integrated system for recording account applications and activating accounts. The integration and automation enabled by the system 10 increases accuracy and efficiency so as to cut administrative costs. Various bank personnel including the data entry specialist 23, the re-key specialist 63, the mismatch specialist 75 and various managers can enter data, change existing data and determine the status of the account application on the same, integrated system. Thus, the personnel do not have to alternate between multiple electronic and paper systems to open the account.

Auditing using the audit system 60 provides a consistent, controlled determination of the percentage of profiles to be audited by avoiding bias and inconsistency of human selection. At the same time, the audit system ensures that entered data is accurate using the mismatch algorithm 70. The rate system 40 eliminates the need to consult multiple paper rate sheets, thereby reducing errors and increasing speed. Despite the automation of rate determination, rate negotiation is still permitted and the number of reviews of the rate exception are reduced by the limits enforced using the rate negotiation system 42. The comment system 80 provides a more organized view of the activity in the account by automatically tracking the progress of the application with the activity log 81 and providing categories for text entries using the free text log 82.

The fraud system 120 allows the bank to verify a customer's identity at the time the account is opened which accelerates the account opening process. Additionally, only those accounts that are suspect (e.g., accounts having a fraud score within a predetermined range or above or below a threshold score) are reviewed by a fraud specialist. Accounts that are not suspect automatically pass through the system and are opened by the activation system 100.

Various figures of the present application include block diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for opening an account for a customer, said account opening system comprising:
   a customer information system comprising computer executable instructions embodied on a computer system and configured to prompt entry of information about the customer and to record the customer information as one of a plurality of profile listings;
   an account information system comprising computer executable instructions embodied on a computer system and configured to prompt and record an interest bearing deposit account type selection and add the account type selection to the profile listing;
   an audit system comprising computer executable instructions embodied on a computer system and configured to assign a profile number to each of the profile listings, to generate a random number corresponding to the profile number of a respective one of the profile listings and to initiate auditing of the respective one of the profile listings;
   an account activation system comprising computer executable instructions embodied on a computer system and capable of receiving a deposit amount submitted by the customer, activating the account and crediting the deposit amount to the account;
   a rate decision system comprising computer executable instructions embodied on a computer system and configured to prompt and record entry of an application date, a rate lock code, a term, a receipt date and a deposit amount and capable of using the application date, the rate lock code, term, receipt date, deposit amount and account type selection as criteria to consult a plurality of electronic rate tables in order to determine an interest rate for the account, the interest rate is determined from the plurality of electronic rate tables available between the application date and the receipt date; and
   a comment system comprising computer executable instructions embodied on a computer system and configured to tag the account to identify a progress status of opening the account.

2. An account opening system of claim 1, wherein the profile number is an integer between lower and upper limits and the random number is a randomly generated integer between the lower and upper limits.

3. An account opening system of claim 2, wherein several random numbers are generated corresponding to a percentage of the profiles for which audit is desired.

4. An account opening system of claim 1, wherein the audit system is further configured to re-record the customer and account information associated with the profile listings and to compare the re-recorded customer and account information with the profile listings.

5. An account opening system of claim 4, wherein the customer information includes a tax identification number.

6. An account opening system of claim 1, wherein the audit system is further configured to re-record the rate lock code, term, receipt date and deposit amount and to compare the re-recorded rate lock code, term, receipt date and deposit amount to the rate lock code, term, receipt date and deposit amount originally recorded.

7. The account opening system of claim 1, wherein the rate decision system is configured to prompt a customer to enter the rate lock code through a customer computer in communication with the account opening system through the Internet.

8. The account opening system of claim 1, wherein the rate decision system is configured to prompt a bank employee to enter the rate lock code.

9. The system of claim 1, wherein the interest rate is the highest interest rate from the plurality of electronic rate tables available between the application date and the receipt date.

10. A computer implemented method of opening an account for a customer, said account opening method comprising:
    recording in electronic form in a computer data entry system entry of customer information and account information, including an interest bearing deposit account type selection, as one of a plurality of profile listings;
    assigning a profile number to each of the profile listings;
    electronically generating a random number within a range of the assigned profile numbers;
    auditing the profile listing having the profile number corresponding to the randomly generated number;
    prompting and recording in electronic form entry of an application date, a rate lock code, a term, a receipt date and a deposit amount and using the application date, the rate lock code, term, receipt date, deposit amount and account type selection as criteria to consult a plurality of electronic rate tables in order to determine an interest rate for the account, wherein the interest rate is determined, by a computer, from the plurality of electronic rate tables available between the application date and the receipt date; and
    tagging the account to identify a progress status of opening the account.

11. A method of claim 10, wherein assigning the profile number includes assigning an integer between lower and upper limits and wherein generating the random number includes generating an integer between the lower and upper limits.

12. A method of claim 10, wherein generating and auditing are repeated a number of times corresponding to a percentage of the profiles for which audit is desired.

13. A method of claim 10, wherein auditing includes re-recording the customer and account information and comparing the re-recorded customer and account information to the customer and account information originally recorded.

14. The method of claim 10, wherein the prompting and recording entry of a rate lock code step includes the step or prompting a customer for entry of the rate lock code through a customer computer communicating through the Internet.

15. The method of claim 10, wherein the prompting and recording entry of a rate lock code step includes the step of prompting a bank employee to enter the rate lock code.

16. The method of claim 10, wherein the interest rate is the highest interest rate from the plurality of electronic rate tables available between the application date and the receipt date.

17. A computer program product for opening an account for a customer, the computer program product comprising a non-transitory computer-readable storage medium having computer-readable program code portions stored therein, the computer-readable program code portions comprising:
- a first executable portion for recording entry of customer information and account information, including an interest bearing deposit account type selection, as one of a plurality of profile listings;
- a second executable portion for assigning a profile number to each of the profile listings;
- a third executable portion for generating a random number within a range of the assigned profile numbers;
- a fourth executable portion for auditing the profile listing having the profile number corresponding to the randomly generated number;
- a fifth executable portion for prompting and recording entry of an application date, a rate lock code, a term, a receipt date and a deposit amount and using the application date, the rate lock code, term, receipt date, deposit amount and account type selection as criteria to consult a plurality of electronic rate tables in order to determine an interest rate for the account, wherein the interest rate is determined from the plurality of electronic rate tables available between the application date and the receipt date; and
- a sixth executable portion for tagging the account to identify a progress status of opening the account and store comments.

18. A computer program product of claim 17, wherein the second executable portion assigns a profile number that is an integer between lower and upper limits and the third executable portion generates a random number that is an integer between the lower and upper limits.

19. A computer program product of claim 17 further comprising a sixth executable portion for re-recording the customer and account information and comparing the re-recorded customer and account information to the customer and account information originally recorded.

20. The computer program product of claim 17, wherein the fifth executable portion prompts a customer to enter the rate lock code through a customer computer communicating through the Internet.

21. The computer program product of claim 17, wherein the fifth executable portion prompts a bank employee to enter the rate lock code.

22. The computer program product of claim 17, wherein the interest rate is the highest interest rate from the plurality of electronic rate tables available between the application date and the receipt date.

* * * * *